Oct. 4, 1949.     A. A. ABRAMSON     2,483,604
CONTAINER AND METHOD OF MAKING THE SAME
Filed June 24, 1944     3 Sheets-Sheet 1
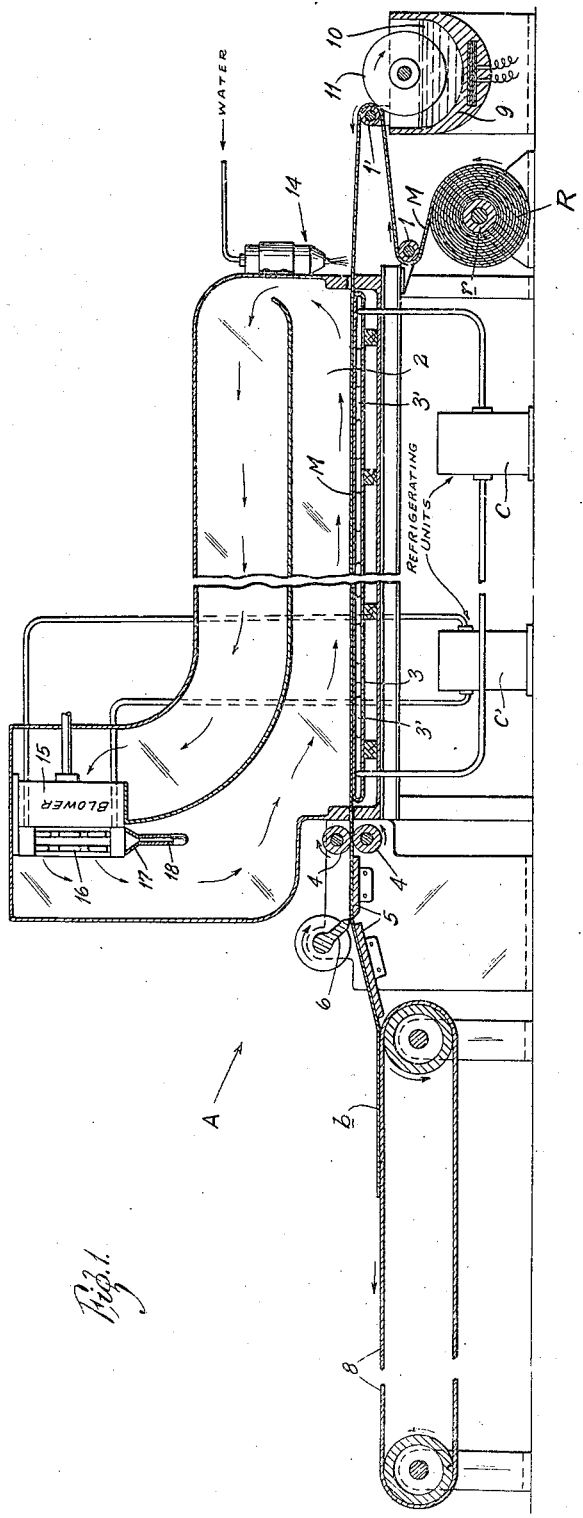
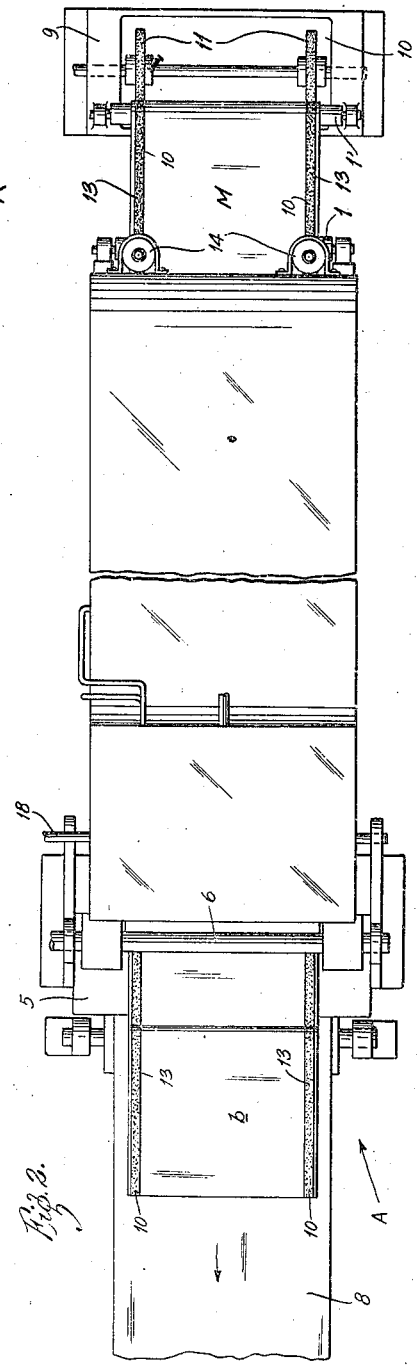
INVENTOR:
ALVIN A. ABRAMSON,
By Alfred W. Petchaft
ATTORNEY.

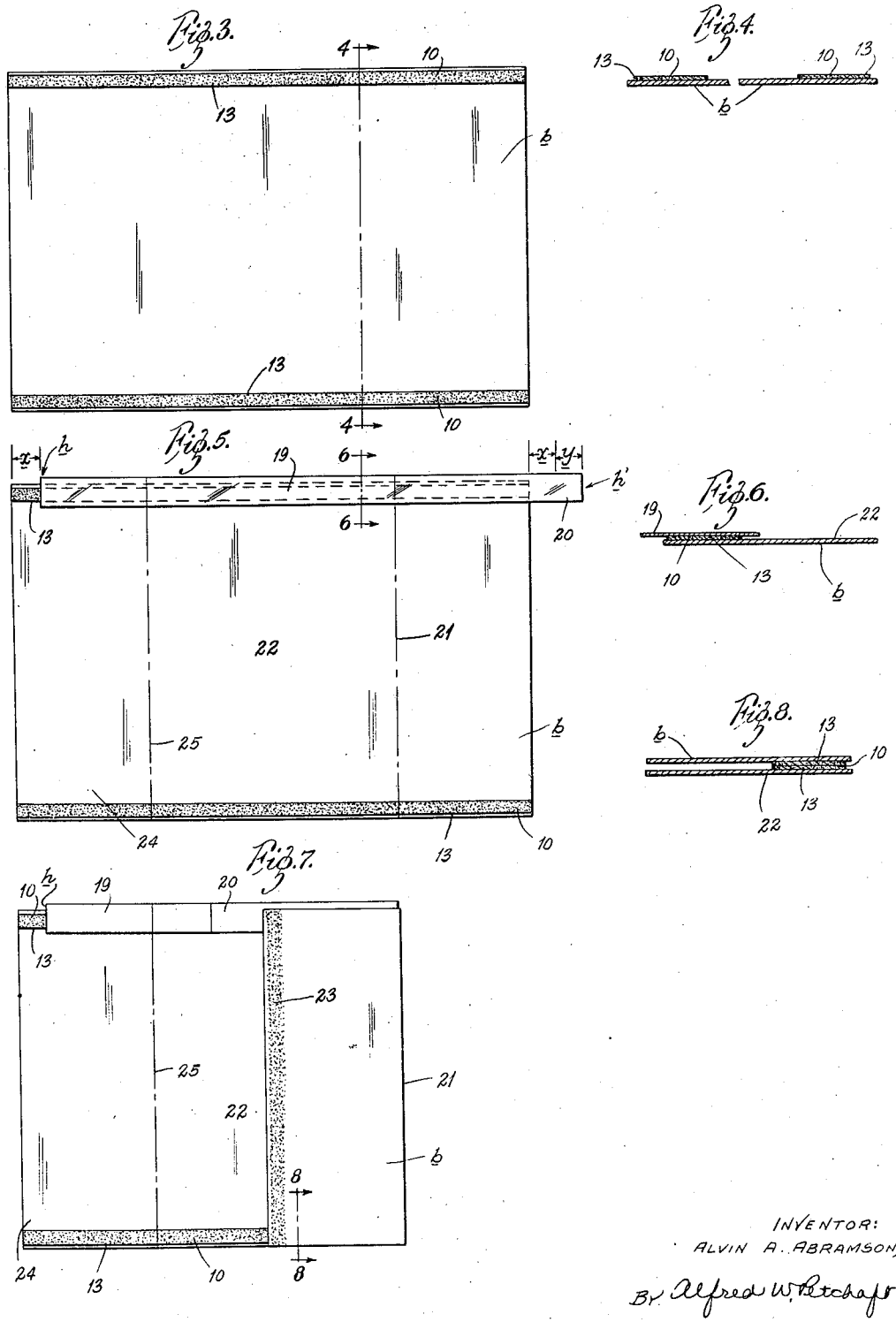

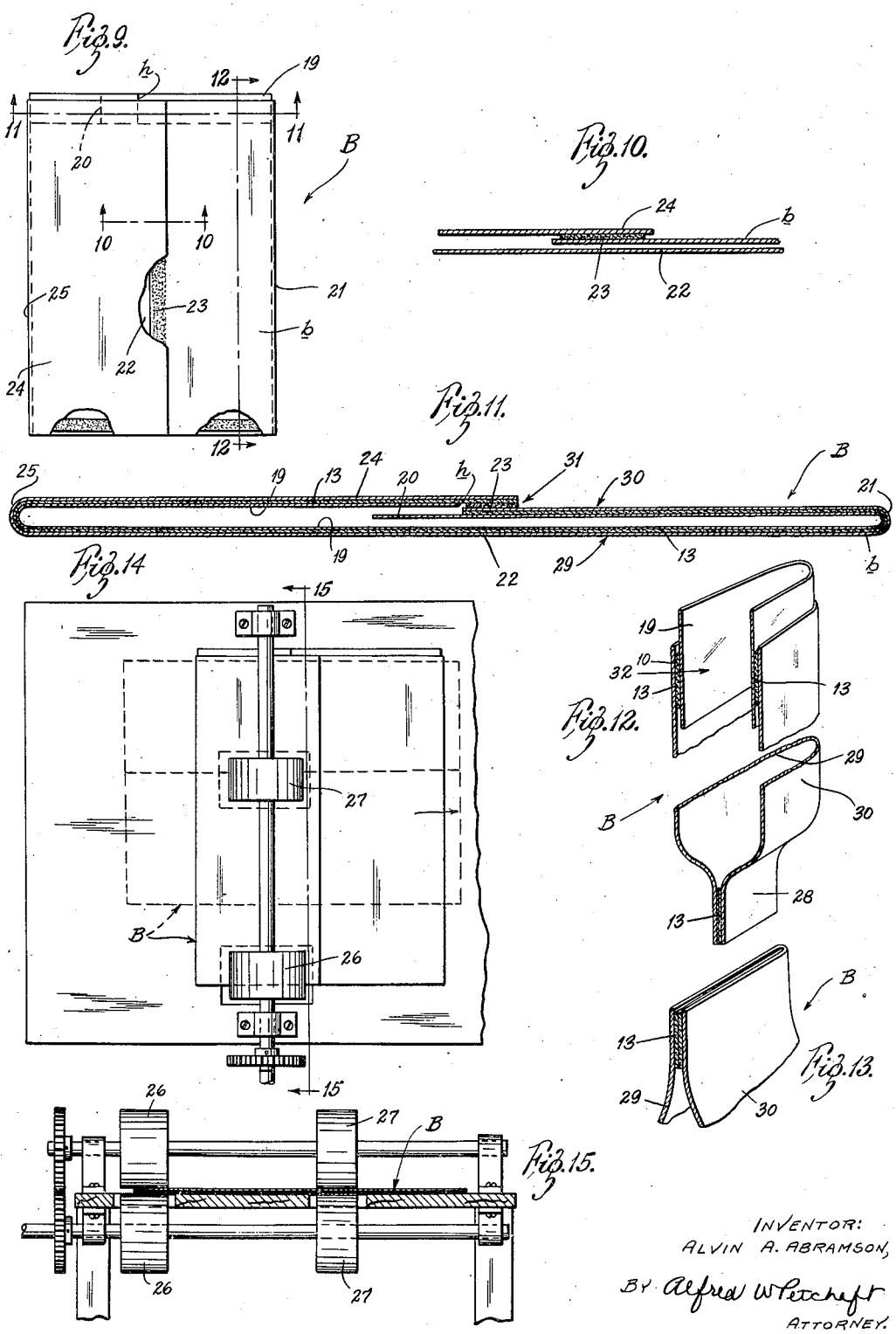

Patented Oct. 4, 1949

2,483,604

UNITED STATES PATENT OFFICE 2,483,604

CONTAINER AND METHOD OF MAKING THE SAME

Alvin A. Abramson, St. Louis, Mo., assignor to Central States Paper & Bag Company, St. Louis, Mo., a corporation of Missouri Application June 24, 1944, Serial No. 541,884

6 Claims. (Cl. 93—35)

This invention relates generally to methods and equipment for manufacturing bags or analogous containers.

For certain purposes of military supply, it has become necessary to procure an extremely large quantity of strong, durable, and waterproof paper bags. Such bags must be fabricated from a heavy multi-ply kraft stock laminated with a thermoplastic waterproof binding agent such as an asphaltic adhesive. In fact, present specifications require a heavy two-ply brown paper stock laminated with a blended asphalt. In addition to this, the seams formed when the material is fabricated into a bag must also be made with a blended asphalt as the adhesive. Such materials are very difficult to work even when made entirely by hand, one at a time, because the asphalt laminated paper, although strong and waterproof when finally fabricated into a bag, is nevertheless very susceptible to atmospheric conditions during the fabricating process. Furthermore, the seam-forming adhesive must be applied while very hot and the bag-blank cannot be worked until this adhesive has been cooled to the optimum temperature. Finally it is necessary to provide a "mouth" or opening for the bag which will permit the bags to remain unsealed while being shipped to the plant or depot where they are to be filled, and yet be readily, quickly, and simply sealed in a waterproof manner after filling.

It is the primary object of the present invention to provide methods and equipment for high speed, mass production of waterproof laminated bags from a continuous roll of flexible sheet material, which, as it is unrolled, is cut into like sections of predetermined dimensions and each section in succession then folded upon itself and marginally seamed.

The present invention has for a further object the provision of machinery for the automatic high speed preparation of bag-blanks properly coated with a suitable waterproof adhesive.

The present invention has for another object the provision of methods and machinery for manufacturing a container having its open end adapted for closure by adhesive applied mechanically during the formation of the container and protected subsequently and pending filling of the container.

And with the above and other objects in view, my invention resides in the unique form and structure of the container and in the steps of its manufacture or production, all as presently described and pointed out in the claims.

In the accompanying drawings (three sheets)—

Figure 1 is a vertical longitudinal sectional view of an apparatus specially designed for utilization in the production of bags or other such containers according to my invention;

Figure 2 is a plan view of the structure or apparatus of Figure 1;

Figure 3 is a plan view of a severed blank of container-forming material as it is delivered from the structure or apparatus of Figures 1 and 2;

Figure 4 is an enlarged broken transverse section through the blank taken approximately on the line 4—4, Figure 3;

Figure 5 illustrates the blank of Figure 3 provided with a protective strip applied upon one of the adhesive-coated longitudinal margins thereof;

Figure 6 is an enlarged detail vertical section taken on the line 6—6, Figure 5;

Figure 7 shows the blank of Figures 3 and 5 partially folded upon itself;

Figure 8 is an enlarged fragmentary section taken on the line 8—8, Figure 7;

Figure 9 illustrates the next step in the folding of the blank;

Figures 10, 11, and 12 are enlarged fragmentary sections taken on the lines 10—10, 11—11, and 12—12, Figure 9, respectively;

Figure 13 is a fragmentary sectional view through the upper end of the bag, showing the adhesive-protecting strip removed from the mouth thereof and the mouth or normally open end adhesively closed after the bag has been filled;

Figure 14 illustrates the folded blank of Figures 9, 10, and 11 being passed, in the next step in the production of the individual bag, under rolls whereby certain adhesive-coated areas thereof are pressed together; and Figure 15 is a vertical section taken on the line 15—15, Figure 14.

Referring now more in detail and by reference characters to the accompanying drawings, R designates a roll of two-ply asphalt-laminated material from which the bag B of Figure 9 is to be formed or constructed. Preferably such material comprises overlying plies of relatively heavy paper laminated with a layer of asphalt or other thermoplastic waterproof adhesive.

The roll R is suitably mounted upon a roller r journaled for rotation at the front end of the blank-forming machine A, and the continuous web of material M is led from roll R first over idlers l and l' and then rearwardly through a controlled-atmosphere chamber 2 having a flat, web-supporting bottom-wall 3 provided on its under side with a cooling coil 3' connected to a suitable refrigerating unit C. As it leaves the bottom-wall 3, the paper passes between a pair of feed rollers 4 to a cut-off table 5, where a predetermined length of the strip-material M is severed by a suitable rotary knife 6 in the provision of a blank b from which an individual bag B is formed or constructed, the blank b being carried or transported flatwise on a conveyor-belt 8 during, and for conveniently and facilely enabling, manual folding and manipulation thereof into the finished bag B, as presently fully appears.

Adjacent the front end of the apparatus A, is a preferably electrically heated tank or reservoir 9 for an asphaltic or other suitable preferably waterproof adhesive 10. A pair of applicator-rollers 11 are journaled for partial peripheral rotation in reservoir 9, each applicator 11 consisting of a narrow disk, the periphery of which during rotation travels through the hot liquid adhesive 10 and applying contacts with the portion of the unrolling web M as it passes over idler 1', as best seen in Figure 1.

It will be noted by observation of Figure 2 that the applicators 11 are spaced a distance approximately equivalent to the width of the particular web M, so that adhesive from the reservoir 9 is continuously deposited thereby on the traveling web M in the form of two marginal stripes 13, and following such application of the adhesive 10 to and upon the web M and as the web M now travels rearwardly through the apparatus A, the adhesive-stripes 13 pass beneath suitable sprayers 14, where they are subjected, as shown, to a fine mist of cold water or other suitable coolant for "quenching" the molten adhesive, that is to say, reducing both the temperature and fluidity thereof.

The traveling and now marginally adhesively equipped web M, as the sheet passes rearwardly through the controlled-atmosphere chamber 2 of the apparatus A, is subjected to streams of cold air, circulated by means of a blower 15 over a cooling coil 16 connected to a suitable refrigerating unit C' and having a condensate catch-trough 17 in turn connected to a suitable drainage pipe 18. In this connection it may be noted that the cooling coil is operated at such temperature as will condition the circulating air both as to temperature and moisture content and, as a result, the air which flows across the surface of the moving web M is maintained precisely at optimum temperature and humidity, so that web M is substantially dried and the temperature of the adhesive-stripes 13 is reduced to such extent as to enable safe manual manipulation or folding of the sheet. It will be understood, of course, that the chamber 2 is of a suitably selected length for accomplishing the result mentioned.

The feed rollers 4 and cutter or knife 6 are geared together or otherwise synchronized, so that each revolution of the cutter 6 permits a sufficient length b of the sheet M to pass or travel to and upon the conveyor 8 for the production of a single bag B.

The length or blank b, see Figure 3, thus formed or provided consists of a flat sheet equipped or provided upon the same face and adjacent its opposite longitudinal margins with two stripes 13 of the adhesive 10, cooled for sheet handling and sufficiently dried, to maintain its contour and thereby avoid spreading over the surface of the sheet, although sufficiently plastic and tacky to unite the coated surfaces under pressure, as presently appears.

As the blank b travels rearwardly on the conveyor 8, it passes a plurality of operator's stations, a sufficient number being provided so that the subsequent manual operations can keep pace with the output of the apparatus A. As it comes along a blank b is removed and a protecting strip 19 is applied manually by an attendant or operator over and upon one of the stripes 13 with one end positioned inwardly of the lateral margin of the blank, as at h, and the other end projecting, as at h', in the provision of a tab 20. It should be noted that this tab 20 has a length equal to the length x of uncovered space at h plus an additional length y which provides a free finger-grip for later removal of the strip when the bag is to be sealed after having been filled. Such protecting strip 19 may be of any suitable non-absorbent material, such, for instance, as a cellulose product of the type commonly known as "Cellophane", which readily adheres to the stripe 13, but which may as readily and easily be removed, when desired.

Following the application, as described, of the protecting strip 19, the blank b is manually folded upwardly on the fold-line 21, Figure 5, and forwardly over the intermediate portion 22 to the position shown in Figure 7. A transverse marginal stripe 23 of asphaltic adhesive is then manually applied upon the upper face thereof, as shown. Thereupon the opposite end-portion 24 of the blank b is folded upwardly along the fold line 25 and downwardly in overlying relation upon adhesive-stripe 23, Figure 9.

The folded blank b is then in the form of a flattened tube, as best seen in Figure 11, and the overlapping adhesive-coated areas, that is the transverse margins and the unprotected longitudinal margin of the blank b, may be firmly and permanently united by suitably passing the folded blank b beneath suitable pressure-rollers 26 and 27, as shown in Figures 14 and 15, and as indicated by the solid and broken lines defining the bag in Figure 14. The rollers 26, 27, as will be understood, force the adhesive into the fiber of the bag-material, making a permanent bond, and completing the bag B for filling. It should also be noted that the vertical or center seam will be securely formed all the way to the upper margin of the bag by reason of the fact that the protecting strip 19 was so applied as to leave the adhesive-stripe 13 free at h, so that it could become an intimate and bonded part of such center seam. At the same time, the cellophane protecting strip 19 is not caught in the center seam and can be easily and quickly removed.

As best seen in Figures 11 and 12, the finished bag B has a bottom comprised by the outturned flange-like portions 28, formed by the longitudinal marginal portions of the blank b secured adhesively together in overlying relation by the unprotected adhesive-stripe 13, a seamless side wall 29, an opposite side wall 30 having a single flat seam, as at 31, and a readily opened mouth, as at 32, defined by the opposite longitudinal and protected margins of the folded blank b. In such regard, the strip 19 continues in protecting position over the marginal stripe 13 at the open or mouth end 32 of the bag B until the bag B is filled, when the strip 19 may be readily removed and such opposing marginal portions of the bag B pressed together between rollers such as shown at 26 and 27 or, while not here shown, by a hand-tool having opposed pressure elements, thereby closing the mouth 32 of the bag, as indicated at 13, Figure 13.

Such method or process of bag-production uniquely provides for mechanical application of the major portion of the adhesive to the sheet as the sheet comes from the roll R, the applied more or less hot adhesive is then cooled and partially solidified and dried, and the sheet then cut automatically to suitable individual bag-lengths or sections, all without handling by the operator, who then takes the severed blank and performs the folding and subsequent cementing operations on each blank as it is delivered onto the conveyor 8, as shown in Figures 1 and 2, hand application of adhesive and the stacking of blanks during cooling and drying into condition for folding and completion of the bags being totally eliminated. The method thus economically provides for mass production, the bags being thus quickly constructed with little labor and most economically with respect to other production costs.

The details of the apparatus A by which the bag-material is fed past the adhesive applicators and to the severing knife and to the operator and at least some of the steps in the operation may be varied substantially without departing from the spirit of the invention, and the exclusive use of those modifications coming within the scope of the claims is contemplated.

Having thus described my invention, what I claim and desire to secure by Letters Patent is:

1. That method of constructing a bag-like container from a section of flexible material which comprises applying a stripe of pressure-sensitive adhesive longitudinally along each side margin of the section, covering one of the stripes of adhesive with a removable strip of material extending substantially throughout the length of the stripe and projecting beyond one transverse margin of the section, folding one end-portion of the section of predetermined width over and upon the section for partially doubling the section upon itself, applying a transverse stripe of adhesive to the exposed transverse margin of said folded end-portion, similarly folding the other end-portion of the section with its end overlapping said transverse stripe and completing the doubling of the section upon itself, and then pressing together the folded parts along the uncovered adhesive stripes, the covered adhesive-coated margin defining an open end for the container adapted for closure by removing said cover strip and pressing the associated margins together.

2. That method of constructing bag-like containers which comprises unwinding a roll of flexible sheet material and applying to and upon one face and longitudinally along the opposite side margins of the sheet as it is unwound substantially continuous stripes of adhesive, severing successive sections of predetermined length of the unwound adhesive-coated sheet, applying a removable strip upon and over one of said adhesive stripes, said strip extending from a point inwardly of one transverse margin of the sheet to a point beyond the other transverse margin of the sheet, successively folding the end-portions of each section towards each other over the intermediate portion of the section, applying a transverse stripe of adhesive to the free margin of the outer face of one folded over end portion, overlapping said latter-mentioned stripe with the end of the other folded over end-portion, and pressing together the overlapped areas with exposed adhesive, the covered adhesive-coated margin defining an open end for the bag for closure by removing said cover-strip and pressing the associated margins together.

3. That method of making bag-like containers which comprises unrolling a sheet of flexible material from a roll, applying continuous stripes of molten adhesive to and upon one face and adjacent the opposite longitudinal margins of the moving sheet, subjecting each adhesive stripe of the moving sheet to a continuous stream of tempered dehumidified air, moving the sheet continuously over a drying bed for removing surplus moisture from the sheet and adhesive, automatically severing the moving sheet transversely of its length into blanks for making individual containers, applying a covering strip of readily detachable material to and upon one stripe of each blank, said strip extending over said stripe from a point spaced a short distance inwardly from one transverse margin of the blank across the entire remaining length of the stripe and outwardly beyond the other transverse margin of the blank, folding the end-portions of each blank over the intermediate portion with the uncovered stripe of adhesive doubled on itself, pressing the uncovered striped portions of the blank together to form the bottom of the container while leaving the covered striped portions of the blank separated to provide an open end for the container, and overlapping and adhesively securing together the transverse margins of the folded end-portions in the formation of a bag side wall having a seam between the bottom and the top of the container.

4. That method of making bag-like containers which comprises unrolling a sheet of flexible material from a roll, applying continuous stripes of molten adhesive to and upon one face and adjacent the opposite longitudinal margins of the moving sheet, subjecting each adhesive stripe of the moving sheet to a continuous stream of tempered dehumidified air, moving the sheet continuously over a drying bed for removing surplus moisture from the sheet and adhesive, automatically severing the moving sheet transversely of its length into blanks for making individual containers, applying a covering strip of readily detachable material to and upon one stripe of each blank, said strip extending over said stripe from a point spaced a short distance inwardly from one transverse margin of the blank across the entire remaining length of the stripe and outwardly beyond the other transverse margin of the blank for a distance substantially greater than the length of the uncovered portion of said stripe, folding the end-portions of each blank over the intermediate portion with the uncovered stripe of adhesive doubled on itself, pressing the uncovered striped portions of the blank together to form the bottom of the container while leaving the covered striped portions of the blank separated to provide an open end for the container, and overlapping and adhesively securing together the transverse margins of the folded end-portions in the formation of a bag side wall having a seam between the bottom and the top of the container.

5. The method of constructing bag-like containers which comprises unwinding a roll of flexible sheet material, applying to and upon one face adjacent each longitudinal side margin of the sheet as it is unrolled a substantially continuous stripe of adhesive, severing successive sections of predetermined length of the unrolled adhesive-coated sheet, applying a covering strip of readily detachable material to and upon one of said adhesive stripes, said strip extending over said stripe from a point spaced a short distance inwardly from one transverse margin of the sheet across the entire remaining length of the stripe and outwardly beyond the other transverse margin of the sheet, folding the end portions of the sheet over the intermediate portion with the uncovered stripe of adhesive doubled on itself, pressing the uncovered striped portions of the sheet together to form the bottom of the container while leaving the covered striped portions of the sheet separated to provide an open end for the container, and overlapping and adhesively securing together the transverse margins of the folded end portions in the formation of a bag side wall having a seam between the bottom and the top of the container.

6. The method of constructing bag-like containers which comprises unwinding a roll of flexible sheet material, applying to and upon one face adjacent each longitudinal side margin of the sheet as it is unrolled a substantially continuous stripe of adhesive, severing successive sections of predetermined length of the unrolled adhesive-coated sheet, applying a covering strip of readily detachable material to and upon one of said adhesive stripes, said strip extending over said stripe from a point spaced a short distance inwardly from one transverse margin of the sheet across the entire remaining length of the stripe and outwardly beyond the other transverse margin of the sheet for a distance substantially greater than the length of the uncovered portion of said stripe, folding the end portions of the sheet over the intermediate portion with the uncovered stripe of adhesive doubled on itself, pressing the uncovered striped portions of the sheet together to form the bottom of the container while leaving the covered striped portions of the sheet separated to provide an open end for the container, and overlapping and adhesively securing together the transverse margins of the folded end portions in the formation of a bag side wall having a seam between the bottom and the top of the container.

ALVIN A. ABRAMSON.

REFERENCES CITED

The following references are of record in the file of this patent:

UNITED STATES PATENTS

| Number | Name | Date |
|---|---|---|
| 537,566 | Dale | Apr. 16, 1895 |
| 793,034 | Kitsee | June 20, 1905 |
| 1,137,281 | Peterson | Apr. 27, 1915 |
| 1,619,081 | McLaurin | Mar. 1, 1927 |
| 1,800,143 | Hughes | Apr. 7, 1931 |
| 1,988,265 | Collings et al. | Jan. 15, 1935 |
| 2,033,223 | Bergstein | Mar. 10, 1936 |
| 2,062,265 | Haskell | Nov. 24, 1936 |
| 2,086,126 | Gilchrist | July 6, 1937 |
| 2,098,258 | Rowe | Nov. 9, 1937 |
| 2,136,990 | Daller | Nov. 15, 1938 |
| 2,147,223 | Vergobbi | Feb. 14, 1939 |
| 2,176,370 | Wagner | Oct. 17, 1939 |
| 2,237,327 | Bell | Apr. 8, 1941 |
| 2,290,564 | Krueger | July 21, 1942 |
| 2,382,930 | Williams | Aug. 14, 1945 |